UNITED STATES PATENT OFFICE.

CLARENCE E. TUCKER, OF HYDE PARK, MASSACHUSETTS.

METHOD OF UTILIZING BATTERY-WASTE.

1,148,062. Specification of Letters Patent. Patented July 27, 1915.

No Drawing. Application filed May 22, 1908. Serial No. 434,390.

*To all whom it may concern:*

Be it known that I, CLARENCE E. TUCKER, a citizen of the United States, residing at Hyde Park, in the county of Norfolk and State of Massachusetts, have invented an Improvement in Methods of Utilizing Battery-Waste, of which the following description is a specification.

This invention relates to the manufacture of various pigments, vulcanizing agents and the like; and comprises a method whereby the battery waste or sediment discarded from storage batteries may be utilized to great profit.

The ordinary battery waste comprises lead sulfate, lead peroxid, sulfuric acid and water, frequently in varying proportions, dependent upon the character of plates used in the batteries, the time which they have been used prior to removal of the waste and, of course, upon the general character of the battery. The preferred method hereinafter described pertains particularly to the conversion of lead sulfate and lead peroxid, found in an impure state of the battery waste, into various commercially valuable substances as, for example, a brown pigment, a vulcanizing agent, a filler for use in making rubber articles, a grayish pigment, litharge and other substances.

Heretofore it has been a common practice to convert battery waste into metallic lead; but in doing so considerable waste was involved and the recovery small as compared with the value of the material actually present in the waste.

The character of this invention may be best understood by reference to an illustrative method about to be described to exemplify a number of uses to which battery waste may be put in practising a method embodying this invention.

The crude battery waste, consisting largely of lead sulfate, lead peroxid and sulfuric acid, with perhaps impurities and foreign substances, may be treated, as by heating or leaching, to drive off the sulfuric acid; and the residue will be a brown substance, ordinarily dark brown, which may be used as a pigment. This pigment, constituting the first product desired to be obtained in the illustrative method, will comprise lead sulfate and lead peroxid in proportions similar to those prevailing in the original waste.

If the mixture be further heated the lead peroxid will be reduced to a lower oxid of lead, at least in part; and perhaps a part of the sulfuric acid will combine with the peroxid to form additional lead sulfate. The resulting mixture will comprise principally lead sulfate and some lower oxid of lead, possibly $Pb_2O$ and $PbO$. By adding to this mixture, or to the original waste, a flux (such, for example, as soda ash or sodium hydrate), with or without water, and heating the mixture to a low temperature, commercial red lead will be produced. Preferably, when the specific illustrative method has this production of impure red lead in view, an oxidizing agent (as, for example, niter) is added to the mixture and the flux. The probable reaction taking place changes the oxid or oxids of lead above referred to, to the $Pb_3O_4$, the lead sulfate being but little acted upon, if any.

By continued heating, to a high temperature of a mixture comprising lead sulfate and a lead oxid or oxids, with a flux and with or without an oxidizing agent, litharge ($PbO$) is produced. The reactions taking place are substantially these:

I. $PbSO_4 + Na_2CO_3 = PbO + Na_2SO_4 + CO_2$.
I$^a$. $PbO_2 = PbO + O$.

Remaining after this reaction is a mixture of litharge, possibly other oxids of lead, sodium sulfate, and, perhaps, an excess of sodium carbonate, the carbon dioxid having, of course, passed off. This mixture being preferably ground, may be leached with water, whereby the sodium sulfate and carbonate will be dissolved, the litharge remaining solid, to be ground, dried and bolted if desired.

The litharge may be purified as, for example, by adding a concentrated solution of some solvent as NaOH; the dissolved litharge and other oxids in solution may be exposed to some agent (as metallic lead) whereby oxids may be changed to $PbO$. Upon cooling the solution pure litharge is separated out.

Upon heating the lead sulfate and the oxid with the flux, with or without an oxidizing agent, if the reaction "I" given above be interrupted before the lead sulfate is entirely converted, the product will be a mixture of litharge and lead sulfate, which may be used as a vulcanizing agent for rubber.

It will be noted that in the final recovery of the litharge from its mixture with sodium sulfate and carbonate the latter are separated, preferably by leaching with warm water. This solution may yield as a valuable by-product, or as a principal product of the method if desired, a large proportion of Glauber salt. To obtain the Glauber salt, the solution of the sodium sulfate and carbonate may be neutralized by adding sulfuric acid, with the following reaction:

II. 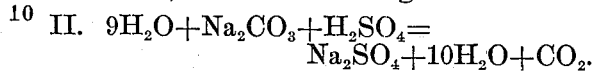
$$9H_2O + Na_2CO_3 + H_2SO_4 = Na_2SO_4 + 10H_2O + CO_2.$$

Also, there may be recovered, in addition to or instead of the Glauber salt, anhydrous sodium sulfate, by the following reaction:

III. 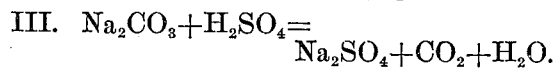
$$Na_2CO_3 + H_2SO_4 = Na_2SO_4 + CO_2 + H_2O.$$

Of course, the preceding reactions presuppose an excess of $Na_2CO_3$ remaining from the flux employed in the earlier stages of the method. If, however, the constituents be so proportioned that no excess remains then the addition of sulfuric acid would be substantially superfluous. It is to be understood that some other flux than sodium carbonate might be used for the purposes of the earlier stages of the method in producing litharge.

Ordinarily an excess of sodium carbonate is likely to occur in solution with the sodium sulfate, and consequently the addition of sulfuric acid may in some cases form an important part of the preferred method, as regards the recovery of a by-product. It is a feature of advantage that such sulfuric acid as is needed may be recovered in the initial treatment of the battery waste and reserved for subsequent use in the connection just described.

The litharge obtained as hereinbefore described may be raised to a moderate temperature until it is converted to $Pb_3O_4$ or red lead.

From litharge obtained as hereinbefore described, soluble lead salts may be obtained by extracting with appropriate acids such as nitric, acetic, formic, etc. By evaporating a solution so obtained crystals of $PbNO_3$, sugar of lead, formate of lead, etc., may be secured. From such solutions chrome yellow may be obtained in the manner hereinbefore explained.

It is to be understood, of course, that this invention is not essentially limited to the details specified in the foregoing descriptive discussion; nor is it essential that the various steps in the method be all employed, nor that they follow the precise sequence suggested.

It is not indispensable that all the features of the invention be used in conjunction, since they are susceptible of use separately to advantage.

The general character of the invention and some of its utilities having been sufficiently disclosed, the various features of the invention will be defined in the subjoined claims.

Claims:

1. A method of utilizing battery waste containing lead sulfate, lead peroxid and an acid, which comprises treating the waste to remove the acid; heating the mixture to reduce some of the peroxid to a lower oxid; adding a flux; and heating further; grinding and leaching the mixture; and isolating the solid residue comprising litharge.

2. A method of utilizing battery waste containing lead sulfate, lead peroxid, which comprises heating the waste mixture to reduce part of the peroxid to a lower oxid; adding a flux and an oxidizing agent; and heating the whole to a low temperature to produce a lead oxid.

3. A method of utilizing battery waste containing lead sulfate which comprises heating the waste with a flux; grinding and leaching the mixture; and isolating the solid residue comprising litharge.

4. A method of utilizing battery waste containing lead sulfate and a lead oxid, which comprises adding a flux and an oxidizing agent to the waste; and heating the whole to produce a lead oxid.

5. A method of utilizing battery waste containing lead sulfate and a lead oxid, which comprises adding a flux to the waste; and heating the whole to produce a lead oxid.

6. A method of utilizing battery waste containing lead peroxid which consists in treating said waste with a flux and heating the mixture to reduce said lead peroxid to litharge.

In testimony whereof, I have signed my name to this specification in the presence of two subscribing witnesses.

CLARENCE E. TUCKER.

Witnesses:
  IRVING U. TOWNSEND,
  ROBERT H. KAMMLER.